United States Patent
Torres et al.

(10) Patent No.: US 10,645,062 B2
(45) Date of Patent: May 5, 2020

(54) SYSTEM AND METHOD FOR IMPROVING PROXY SERVER PERFORMANCE USING LOCAL DOMAIN NAME SYSTEM (DNS) CACHE AND CONNECTIVITY MONITORING

(71) Applicant: Hughes Network Systems LLC, Germantown, MD (US)

(72) Inventors: Robert James Torres, New Market, MD (US); George Choquette, Potomac, MD (US); Ganeshan Ramachandran, Frederick, MD (US); Sanjay Jayaramu, Gaithersburg, MD (US)

(73) Assignee: Hughes Network Systems LLC, Germantown, MD (US)

( * ) Notice: Subject to any disclaimer, the term of this patent is extended or adjusted under 35 U.S.C. 154(b) by 196 days.

(21) Appl. No.: 15/856,739

(22) Filed: Dec. 28, 2017

(65) Prior Publication Data
US 2018/0191672 A1 Jul. 5, 2018

Related U.S. Application Data

(60) Provisional application No. 62/440,513, filed on Dec. 30, 2016.

(51) Int. Cl.
*G06F 15/16* (2006.01)
*H04L 29/12* (2006.01)
*H04L 29/08* (2006.01)

(52) U.S. Cl.
CPC ...... *H04L 61/6009* (2013.01); *H04L 61/1511* (2013.01); *H04L 67/28* (2013.01); *H04L 61/6013* (2013.01)

(58) Field of Classification Search
CPC . H04L 61/6009; H04L 61/1511; H04L 67/28; H04L 61/6013
See application file for complete search history.

(56) References Cited

U.S. PATENT DOCUMENTS

| | | | |
|---|---|---|---|
| 5,392,432 A | 2/1995 | Engelstad et al. | |
| 7,418,504 B2 | 8/2008 | Larson et al. | |

(Continued)

OTHER PUBLICATIONS

International Search Report and Written Opinion dated Mar. 7, 2018 in corresponding International Application No. PCT/US2017/068865, filed Dec. 29, 2017.

(Continued)

*Primary Examiner* — Moustafa M Meky
(74) *Attorney, Agent, or Firm* — Global IP Counselors, LLP

(57) ABSTRACT

A system and method for improving proxy server performance in a communication network. The system and method employ a proxy server configured to, in response to a request identifying a domain name, determine whether domain name resolution information associated with the domain name is stored in a storage accessible by the proxy server and has exceeded an expiration time for the domain name resolution information, provide the domain name resolution information from the storage in response to the request via the network upon determining that the domain name resolution information is stored in the storage, has exceeded the expiration time and meets a delivery condition, and request from a domain name server updated domain name resolution information upon determining that the domain name resolution information is at least one of absent from the storage and has exceeded the expiration time.

18 Claims, 5 Drawing Sheets

(56) References Cited

U.S. PATENT DOCUMENTS

| | | | | |
|---|---|---|---|---|
| 8,606,926 | B2* | 12/2013 | Ulevitch | H04L 29/12066 |
| | | | | 709/227 |
| 8,615,583 | B2 | 12/2013 | Plamondon | |
| 8,676,989 | B2* | 3/2014 | Treuhaft | H04L 29/12066 |
| | | | | 709/227 |
| 8,694,642 | B2* | 4/2014 | Dempsky | H04L 61/6013 |
| | | | | 709/226 |
| 8,966,122 | B2* | 2/2015 | Treuhaft | H04L 61/1511 |
| | | | | 709/245 |
| 9,160,702 | B2* | 10/2015 | Dempsky | H04L 61/6013 |
| 9,191,402 | B2* | 11/2015 | Yan | H04L 61/1511 |
| 9,276,902 | B2* | 3/2016 | Treuhaft | H04L 29/12066 |
| 9,450,840 | B2* | 9/2016 | Denis | H04L 43/04 |
| 9,723,022 | B2* | 8/2017 | Denis | H04L 43/04 |
| 9,807,050 | B2* | 10/2017 | Siba | H04L 61/2007 |
| 9,935,969 | B2* | 4/2018 | Yan | H04L 61/1511 |
| 9,979,748 | B2* | 5/2018 | O'Connor | H04L 63/145 |
| 10,277,554 | B2* | 4/2019 | Townsend | H04L 61/20 |
| 2005/0010552 | A1 | 5/2005 | Stevens et al. | |

OTHER PUBLICATIONS

International Preliminary Report on Patentability dated Jul. 2, 2019 in corresponding International Patent Application No. PCT/US2017/068865, filed Dec. 29, 2017.

* cited by examiner

SYSTEM AND METHOD FOR IMPROVING PROXY SERVER PERFORMANCE USING LOCAL DOMAIN NAME SYSTEM (DNS) CACHE AND CONNECTIVITY MONITORING

CROSS-REFERENCE TO RELATED APPLICATION

This application claims priority to U.S. Provisional Application No. 62/440,513, filed Dec. 30, 2016, the contents of which are hereby incorporated herein by reference.

BACKGROUND

Field of the Invention

The present invention generally relates to system and method for improving proxy server performance. More particularly, the present invention relates to a system and method for improving proxy server performance in a communication network, such as a satellite communication network, using a local domain name system (DNS) cache and connectivity monitoring.

Background Information

As understood in the art, any broadband IP network, such as a satellite communication network, typically employs or has access to the DNS name server. The DNS name server provides the domain name to IP address mapping, and vice-versa. The DNS name servers typically handle several thousands of name lookup requests per minute, and a quick response is therefore critical for desired network performance and to improve end-user experience. DNS name servers support the capability to cache name resolutions in order to minimize the interactions with upstream name servers. Normally, the DNS name servers are co-located with network entities that require name resolution to minimize the network transport delays. However, depending on the type of the network and network architecture, the DNS name servers may not be co-located with such network entities.

Also, even when the DNS name servers are co-located with the network entities, the recursive lookups can require interaction with other DNS name servers that are not co-located. For example, in satellite based IP networks, the location of the gateway or the hub and the area where the services are provided may be geographically separate. The DNS name servers are also likely to be located in the region where the service is provided to provide such service for users in the local community. For example, DNS name servers located in a certain geographic region can serve content, such as news, sporting information, weather, etc., pertaining to that geographic region from entities located in that region.

SUMMARY

In situations where the DNS name servers are not co-located with the network entities, or are co-located with the network entities but interact with other DNS name servers that are not co-located, the transport delay between the gateway and DNS name server will be non-negligible and sensitive to network link characteristics. Although the caching capability of DNS name servers can help in reducing the impact of transport delays, such caching does not provide the necessary flexibility to optimize the end-to-end performance of the network.

To address the issues discussed above, disclosed embodiments provide a system and method for improving proxy server performance. More particularly, the present invention relates to a system and method for improving proxy server performance in a communication network, such as a satellite communication network, using a local domain name system (DNS) cache and connectivity monitoring. The system and method employ a proxy server configured to, in response to a request identifying a domain name, determine whether domain name resolution information associated with the domain name is stored in a storage accessible by the proxy server and has exceeded an expiration time for the domain name resolution information, provide the domain name resolution information from the storage in response to the request via the network upon determining that the domain name resolution information is stored in the storage, has exceeded the expiration time and meets a delivery condition, and request from a domain name server updated domain name resolution information upon determining that the domain name resolution information is at least one of absent from the storage and has exceeded the expiration time.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

As will now be described, disclosed embodiments provide a system and method improving proxy server performance in a communication network. The system and method can be employed in any suitable device, such as a gateway in a satellite communication network.

Figure 1:
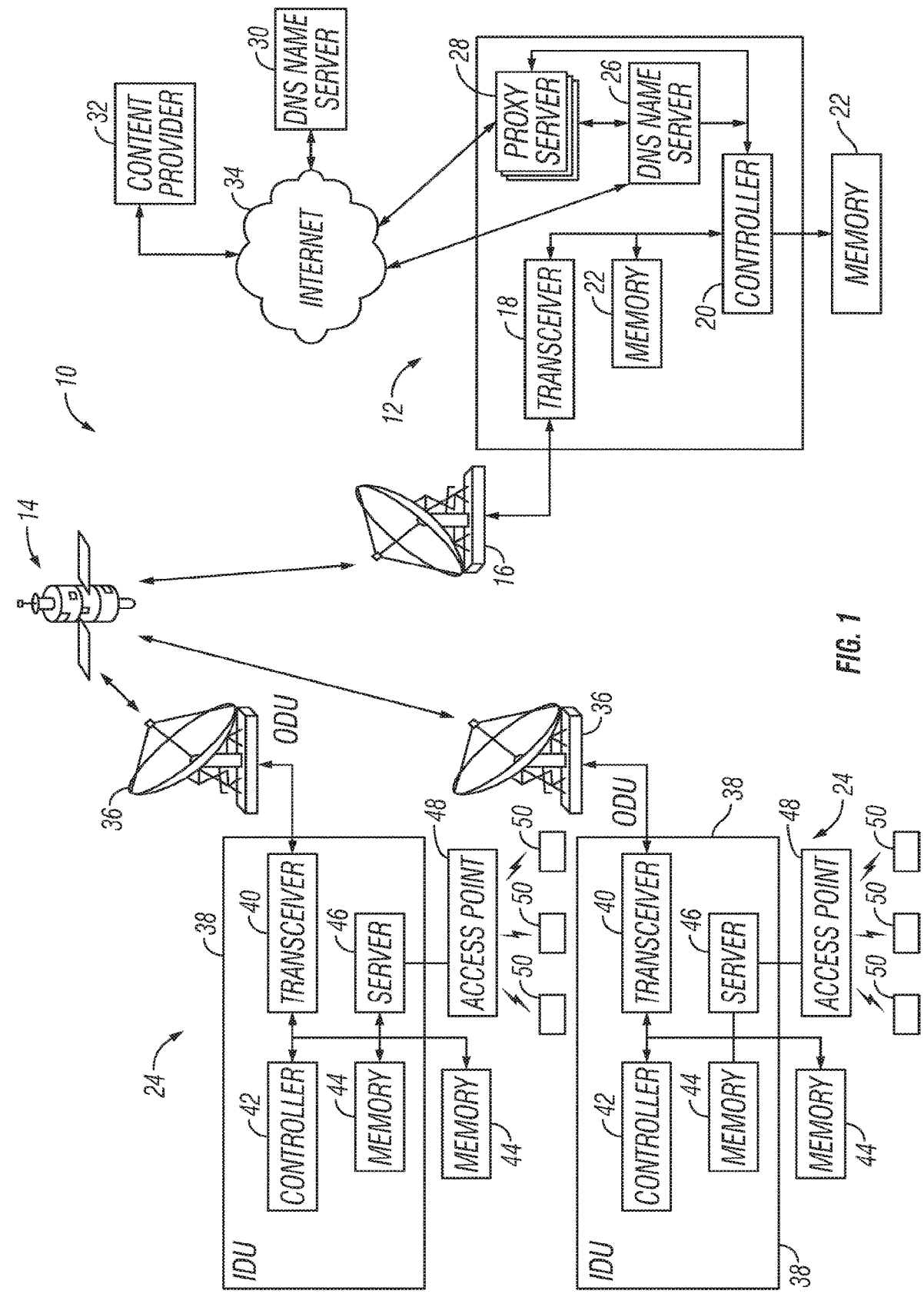
FIG. 1 illustrates an example of a satellite communication network in which a system for improving proxy server performance using a local domain name system (DNS) cache and connectivity monitoring according to a disclosed embodiment is employed.

FIG. 1 illustrates an example of a satellite communication network 10 employing a system for improving proxy server performance according to an exemplary embodiment. A satellite communication network 10 typically includes a plurality of terrestrially mounted gateways 12 that communicate with one or more orbiting satellites 14. Each satellite gateway includes an antenna dish 16, a transceiver 18, a controller 20, a memory 22 and other types of equipment (not shown) such as amplifiers, waveguides and so on as understood in the art on which enable communication between the gateway 12 and a plurality of satellite user terminals 24 via one or more of the orbiting satellites 14. The memory 22 can be, for example, an internal memory in the gateway 12, or other type of memory devices such as flash memory or hard drives with external high speed interface such as a USB bus or an SATA bus, or remote memories such as cloud storage and so on. These other types of memory can be present at the gateway 12 or accessible at a location apart from the gateway 12 via a network connection such as an Ethernet connection, a WiFi connection or any other suitable type of connection as understood in the art.

As understood in the art, the controller 20 preferably includes a microcomputer with a control program that controls the gateway 12 as discussed herein. The controller 20 can also include other conventional components such as an input interface circuit, an output interface circuit, and storage devices such as a ROM (Read Only Memory) device and a RAM (Random Access Memory) device. The RAM and ROM store processing results and control programs that are run by the controller 20. For purposes of the description herein, the controller 20 can perform operations associated with a gateway modulator, or the gateway modulator can be configured as a separate device or devices. The controller 20 can also perform the operations for improving proxy server performance as described herein with regard to FIGS. 2 through 5. The controller 20 is operatively coupled to the components of the gateway 12 as appropriate, in a conventional manner. It will be apparent to those skilled in the art from this disclosure that the precise structure and algorithms for the controller 20 can be any combination of hardware and software that will carry out the functions of the present invention.

The gateway 12, satellites 14 and satellite user terminals 24 typically communicate with each other over a radio frequency link, such as a Ku-band link, a Ka-band link or any other suitable type of link as understood in the art. The gateway 12 further includes a DNS name server 26 and a plurality of proxy servers 28 as discussed in more detail below. The plurality of proxy servers 28 are referred to herein simply as a "proxy server 28." However, the functionality described herein can be performed by all of the proxy servers 28, or by a plurality of proxy servers 28 when the DNS proxy has a distributed configuration. The DNS name server 26 and the proxy server 28 can be controlled by the controller 20, or embodied all or at least in part by the controller 20, as understood in the art. The DNS name server 26 and the proxy server 28 can communicate with, for example, a DNS name server 30 and a content provider 32 via, for example, the Internet 34 as discussed in more detail below. One or more of the gateways 12 can be configured as a network management center or network operating center which, among other things, operate to communicate with remote sites, such as web content providers 32, via the Internet 34, cloud storage, or other communication networks as understood in the art. In addition, the gateways 12 can communicate with each other via, for example, the Internet 34 or other communication networks.

As further shown in FIG. 1, a satellite user terminal 24 typically includes an antenna dish 36 that is commonly referred to as an outdoor unit (ODU), and a device such as a set-top box or other type of equipment that is commonly referred to as an indoor unit (IDU) 38. The IDU 38 typically includes a transceiver 40, a controller 42, a memory 44, a local server 46 and other types of equipment (not shown) such as amplifiers, waveguides and so on as understood in the art on which enable communication between the satellite user terminal 24 and one or more gateways 12 via one or more of the orbiting satellites 14. A transceiver 40 can include, for example, an integrated satellite modem and any other suitable equipment which enables the transceiver 40 to communicate with one or more of the orbiting satellites 14 as understood in the art. The memory 44 can be, for example, an internal memory in the satellite user terminal 24, or other type of memory devices such as a flash memory or hard drives with external high speed interface such as a USB bus or an SATA bus, or remote memories such as cloud storage and so on. These other types of memory can be present at the satellite user terminal 24 or accessible at a location apart from the satellite user terminal 24 via a network connection such as an Ethernet connection, a WiFi connection or any other suitable type of connection as understood in the art.

As with the controller 20 for a gateway 12, the controller 42 preferably includes a microcomputer with a control program that controls the satellite user terminal 24 as discussed herein. The controller 42 can also include other conventional components such as an input interface circuit, an output interface circuit, and storage devices such as a ROM (Read Only Memory) device and a RAM (Random Access Memory) device. The RAM and ROM store processing results and control programs that are run by the controller 42. The controller 42 is operatively coupled to the components of the satellite user terminal 24 as appropriate, in a conventional manner. In addition, the controller 42 can perform FEC operations, or the FEC can be configured as a separate device or devices, as understood in the art. It will be apparent to those skilled in the art from this disclosure that the precise structure and algorithms for the controller 42 can be any combination of hardware and software that will carry out the functions of the present invention.

The memory 44 can be, for example, an internal memory in the terminal 24, or other type of memory devices such as a flash memory or hard drives with external high speed interface such as a USB bus or an SATA bus, or remote memories such as cloud storage and so on. These other types of memory can be present at the terminal 24 or accessible at a location apart from the terminal 24 via a network connection such as an Ethernet connection, a WiFi connection or any other suitable type of connection as understood in the art. Also, the local server 46 can communicate with an access point 48, such as a WAP or any other suitable device, which enables the local server 46 to provide packets to end user devices 44 as discussed herein. Such end user devices 50 include, for example, desktop computers, laptop or notebook computers, tablets (e.g., iPads), smart phones, Smart TVs and any other suitable devices as understood in the art. Naturally, the communications between the local server 46, the access point 48 and the end user devices 50 can occur over wireless connections, such as WiFi connections, as well as wired connections as understood in the art.

In a satellite communication network 10 described herein, it is desirable to provide content, such as web pages, streaming video and so on, to the end user devices 50 with as little latency as possible to improve end-user experience. As will now be described, disclosed embodiments are configured and operable to non-intrusively improve the performance of the satellite communication network 10 and the experience at the end-user devices 50 by augmenting the name resolution caching with automatic back refresh. As further described, the disclosed embodiment can use connectivity metrics and the statistics gathered from interactions with the DNS name server 26 to further enhance the core functions.

The embodiments described herein can be implemented, for example, in any Internet Service Provider that may use proxy servers to improve end-user experience. For example, the disclosed embodiments can be implemented in a satellite communication network 10 such as the Jupiter Network by Hughes Network Systems, LLC. Also, a VSAT terminal used in the Jupiter Network can provide local caching at the terminal 24 itself to address latency that can occur due to the typical latency associate with the communication links between the terminal 24, satellite 14 and gateway 12. However, such local caching at a terminal 24 fails to address the type of terrestrial latency discussed herein, especially in cases where the gateway 12 serving the terminals 24 is geographically removed from the servers that the terminals 24 are accessing for services provided by those servers.

As discussed above with regard to FIG. 1, the satellite communication network 10 can provide Internet access to a plurality of terminals 24 distributed across the satellite coverage area using gateways 12 that may be distributed, centralized or a hybrid of distributed and centralized equipment, with some gateway equipment being distributed and other gateway equipment being in a centralized location. As understood in the art, it is common in satellite communication networks, such as satellite communication network 10, for a gateway 12 to be widely separated from location where the service is provided, and sometimes these locations can even be in two different continents (e.g., North America and South America). The proxy server 28 in the disclosed embodiments is configured as a specialized server that is located, for example, in the gateway 12 of satellite communication network 10 and is used for improving network performance, end user network access experience, and network security by performing tasks such as content caching, content filtering and other satellite network specific optimizations as understood in the art.

As described in more detail below, the proxy server 28 interacts with the DNS name server 26 in the gateway 12 for obtaining domain name resolution, that is, domain name to IP address translation as understood in the art. For purposes of the description herein, the terms "name resolution," "DNS resolution" and "DNS lookup" are interchangeably used to refer to "domain name resolution" as understood in the art. The DNS server 26 can, if necessary or desirable, communicate with other upstream DNS name servers 30 if the DNS server 26 does not have name resolution information stored, for, example, in one of the local memories or caches in the DNS server 26 or in any other memory 22 or suitable location in the gateway 12. Furthermore, minimizing the time spent waiting for name resolution improves proxy server performance, which in turn directly impacts the end-user experience.

As discussed above, placing the DNS name server 30 in close proximity to the network proxy servers, as well as caching the name resolutions, are common techniques for minimizing the DNS lookup times. However, as also discussed above, placing the DNS name server 30 closer to the proxy servers may not be feasible especially when gateway 12 and the area where the service is provided are widely separated. Moreover, even if the DNS name server 30 and proxy server 12 are co-located, it is very likely that the DNS name server 30 located closer to the gateway 12 generally will have to communicate with another upstream DNS name server 30 to obtain the name resolutions. These upstream DNS name servers 30 are likely to be located closer to the service area since majority of the access will be those related to local community (e.g. within the country). The result is that the time taken for completing DNS lookups will be significantly higher due to delays introduced by the transit networks between the gateway 12 and the upstream DNS name server 30.

As also discussed above, caching the name resolution by DNS name servers 30 can be used in an attempt to improve network performance. However, the caching support provided by DNS name servers 30 is not flexible to optimize end-to-end network performance due to the following reasons.

For example, DNS name servers 30 usually are independent commercial off-the-shelf (COTS) subsystems that implement the Internet Engineering Task Force (IETF) DNS request for comments (RFCs) with limited capability to fine tune the cache behavior that optimizes the performance of network components such as proxy servers. For example, if a common DNS name server 30 is shared by multiple networks, then the configuration cannot readily be changed without affecting performance of other networks. In addition, DNS name servers 30 are completely unaware of actual connectivity conditions (i.e., the DNS name servers 30 supply the IP address, but have no information on whether or not connections to that IP address was successful). If the content server (e.g., a content provider 32) identified by the IP address is overloaded or if the network interface is faulty, then the network performance and end-user experience may be severely impacted. Also, cached data on the DNS name servers 30 are subject to time-to-live duration. Thus, there is limited or no capability to exploit the infrequent changes in name to IP address mappings. Furthermore, implementing functions that take in account specific networks characteristics (e.g., busy hours) to improve end-to-end network performance typically requires costly software changes.

Accordingly, the disclosed embodiments implement an independent (i.e., external to the DNS name server 30) caching of name resolutions with necessary configurability and control to address the above shortcomings. The disclosed embodiments also provide a DNS proxy for providing the DNS protocol functions for interacting with DNS name servers 30. As described in more detail below, the DNS proxy functionality can be performed, for example, by the proxy server 28. In the example shown in FIG. 1, the proxy server 28 resides in the gateway 12. However, the DNS proxy functionality can also be part of any application server that is dependent on name resolutions for its functioning.

In this example, the DNS proxy performed by the proxy server 28 contains two independent logical components, namely, a cache and a stub DNS resolver. The cache implements the caching functionality (caching data structures and algorithms as well as access mechanisms) for servicing several parallel name resolution requests. The stub DNS resolver implements the DNS protocol functionality required for interacting with the DNS name servers. Decoupling the caching functionality from the DNS protocol handling aspects provides several advantages. For example, the cache can be placed closer to the entities/applications that need the name translations, thereby allowing zero or about zero delay resolutions. Also, network architecture and application specific caching schemes and algorithms can be implemented without affecting the protocol handling. Furthermore, protocol handling itself can be implemented using COTS libraries, thereby enabling a quick and robust software implementation.

As will now be described with reference to the flowcharts in FIGS. 2 through 5, the proxy server 28 and related components provide a DNS proxy function capable of performing local caching of name resolution, automatic back refresh to request a name resolution from an upstream DNS name server 30 if the cached name resolution entry is expired, and conditional serving of expired entries to improve performance. During local caching of name resolution, data received from a DNS name server (e.g., a DNS name server 30) is "cached" by the DNS proxy of the proxy server 28 so that requests for the same domain, received at a later time, can be served quickly from the local cache instead of communicating with a DNS name server 30. If the upstream DNS name server 30 is not co-located with the proxy server 28, then this caching feature will eliminate the transport delay and greatly improve the end-to-end performance. Also, if the cached entry has expired, the proxy server 28 can perform the automatic back refresh operation to request a name resolution from an upstream DNS name server 30. In this example, the proxy server 28 can request that the DNS name server 26 in the gateway 12 perform this request, since the DNS name server 26 is configured to perform this type of request. Furthermore, during the conditional serving operations, the proxy server 28 can conditionally serve the expired cached entry for delivery to end-users while waiting for back refresh procedure to be completed. Serving expired entries provides a significant improvement, especially if the name to IP address mapping does not change, which is typically is the case. However, in some cases, the name to IP address mapping may change, for example, when content delivery networks (CDNs) are employed or due to dynamic load balancing. For such scenarios, the proxy server 28 can use historical information on the how frequently the mappings change to intelligently decide whether or not an expired address should be served.

As will also be appreciated from the following description, the proxy server 28 and related components also provide other functionalities that further enhance the above features to improve the network application performance and end-user experience. These additional functionalities include automatic detection of problems with specific IP addresses and domains, intelligent caching, automatic scaling of back refreshes during busy hours, adaptive cache resizing, and inter-DNS proxy communication for sharing cache information.

Figure 2:
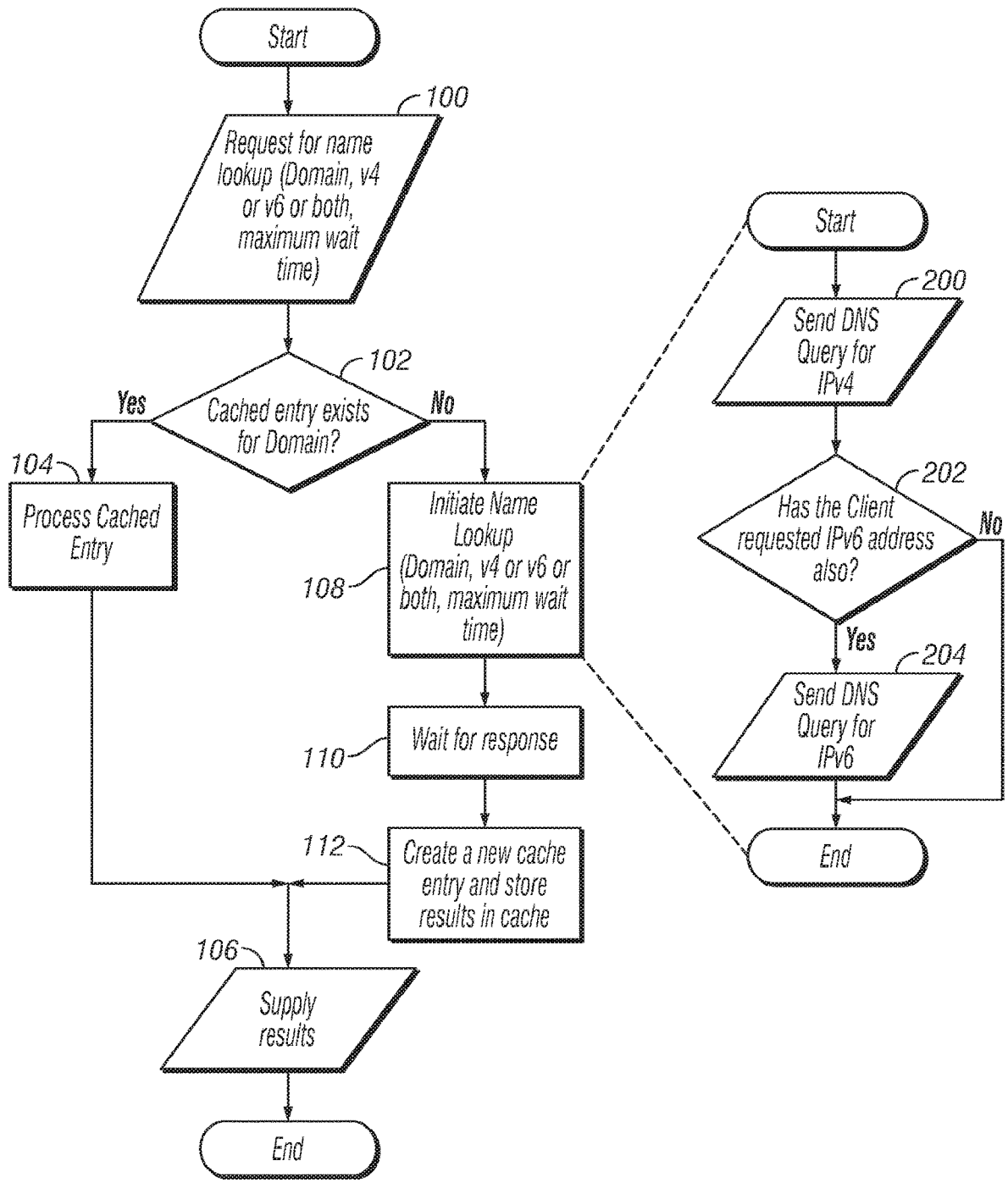
FIG. 2 is a flowchart illustrating exemplary operations performed by the system shown in FIG. 1 for performing DNS name and IP address resolution according to a disclosed embodiment.

FIG. 2 is a flowchart illustrating an example of operations performed by the proxy server 28 according to a disclosed embodiment. As mentioned above, these operations can be performed by the proxy server 28, for example, under the control of the controller 20, or in any other suitable manner. As further discussed above, the proxy server 28 implements a cache for storing name resolutions, allows parallel access to the cache contents, supplies name resolution (if available) from the cache, interacts with the DNS name server 30 (e.g., via DNS name server 26) to update name resolution for expired cache entries, and interacts with the DNS name server 30 (e.g., via DNS name server 26) to obtain the name resolution for names that are not in the cache and store the response in the cache. Also, for purposes of the description herein, the terms "proxy server 28" and "DNS proxy" can be used interchangeably since, in these examples, the functions of the DNS proxy can be performed by the proxy server 28. Furthermore, the DNS proxy can be distributed among a plurality of proxy servers 28 within, for example, a gateway 12 or disposed at other suitable locations within the satellite communication network 10.

When an end user device 50, for example, requests content from the satellite communication network 10, clients such as other proxy servers and network applications will provide a request to the proxy server 28 for name resolution in Step 100. The manner in which the request is propagated to the proxy server 28 is implementation dependent. For example, a common implementation technique is to provide a function call interface in which the client invokes a function with the domain name for which the IP address is required. In such a common implementation, the client can be blocked until the name resolution is complete. Under normal operation, the response would come from the cache, and therefore the client will have wait for very small amount of time. The function call interface can also enable the client to specify if the client is interested in IPv6 addresses or just IPv4 addresses. Additionally, the client can also specify the maximum time that the client is willing to wait for a resolution. The maximum wait time can be used to implement a fail fast strategy, in which a lookup failure triggers a retry attempt or the error is propagated higher in hierarchy for other entities to take an appropriate decisions. Other issues, such as concurrency, error handling, and so on, also can be taken into account.

The cache implemented by the proxy server 28 stores, for example, name resolution records or entries. In this example, each entry contains the following information: list of IPv4 addresses and the corresponding time-to-live (TTL) value; list of IPv6 addresses and the corresponding time-to-live (TTL) value; time stamp corresponding to the most recent update of the addresses using the response received from the DNS name server; and statistics/metrics, along with any other suitable information as would be understood by one skilled in the art.

In Step 102, the proxy server 28 performs the cache lookup using the domain name. Naturally, the processes discussed herein for resolving the domain name can also be performed for resolving, for example, a canonical name (cname) or any other type of name requiring resolution with an IP address. As would be understood by one skilled in the art, there is one entry per domain name and the entry contains one or more IPv4 and/or IPv6 addresses. Also, the number of IPv4 and IPv6 addresses stored per entry can be limited based on configuration to minimize the storage requirements. For example, each cache entry can store a maximum of five IPv4 and IPv6 addresses. Thus, if the DNS response received from the DNS name server 30 contains more than five entries, then only the first five are stored and the remaining are ignored. Naturally, each cache entry can be configured to store as many entries as deemed suitable. Other issues such as concurrency, error handling, cache lookup time, memory usage, cache sizing, and so on, are also taken into consideration when implementing the caches used by the proxy server 28. Each IP address in the cache entry also contains a TTL or time-to-live value in seconds. This TTL field is set to the same value that is specified in the DNS response. When the TTL supplied by the DNS name server 30 is large (e.g., exceeds a configurable threshold), then it may be beneficial to alter the TTL to a smaller value, so as to prevent serving stale entries if the name-to-IP mapping is changed in the DNS name server. A cache entry is valid if at least one IP address has a TTL that has not elapsed since the last time the entry was created/updated. Also, a cache entry is considered expired if the TTL of all IP addresses have elapsed with respect to the last update/create time.

If the proxy server 28 determines in Step 102 that a valid cached entry exists for the domain name, the proxy server 28 provides the cached entry in Step 104 for delivery to the requesting client by the gateway 12 in Step 106. However, if the proxy server 28 determines in Step 102 that a valid cached entry does not exist, the proxy server 28 can initiate a name lookup process in Step 108.

That is, when a name lookup request arrives for an entry that has expired, then the DNS proxy operations of the proxy server 28 will automatically initiate a name lookup by, for example sending a DNS query for an IPv4 address to a DNS name server 30 in Step 200. As mentioned above, since the DNS name server 26 at the gateway 12 includes the functionality to send the DNS query, the proxy server 28 can send the request directly, or can request the DNS name server 26 to send the request to the remote DNS name server 30. Also, if the proxy server 28 determines in Step 202 that the client also requested an IPv6 address, the proxy server 28 sends, either directly or via the DNS name server 26, a request for a DNS query for an IPv6 address to a DNS name server 30 in Step 204.

The proxy server 28 waits for a response from the DNS name server 30 in Step 110. Upon receiving a successful response from the DNS name server 30, the proxy server 28 updates the cache entry in Step 112. The proxy server 28 thus provides the updated cached entry for delivery to the requesting client by the gateway 12 in Step 106.

Figure 3:
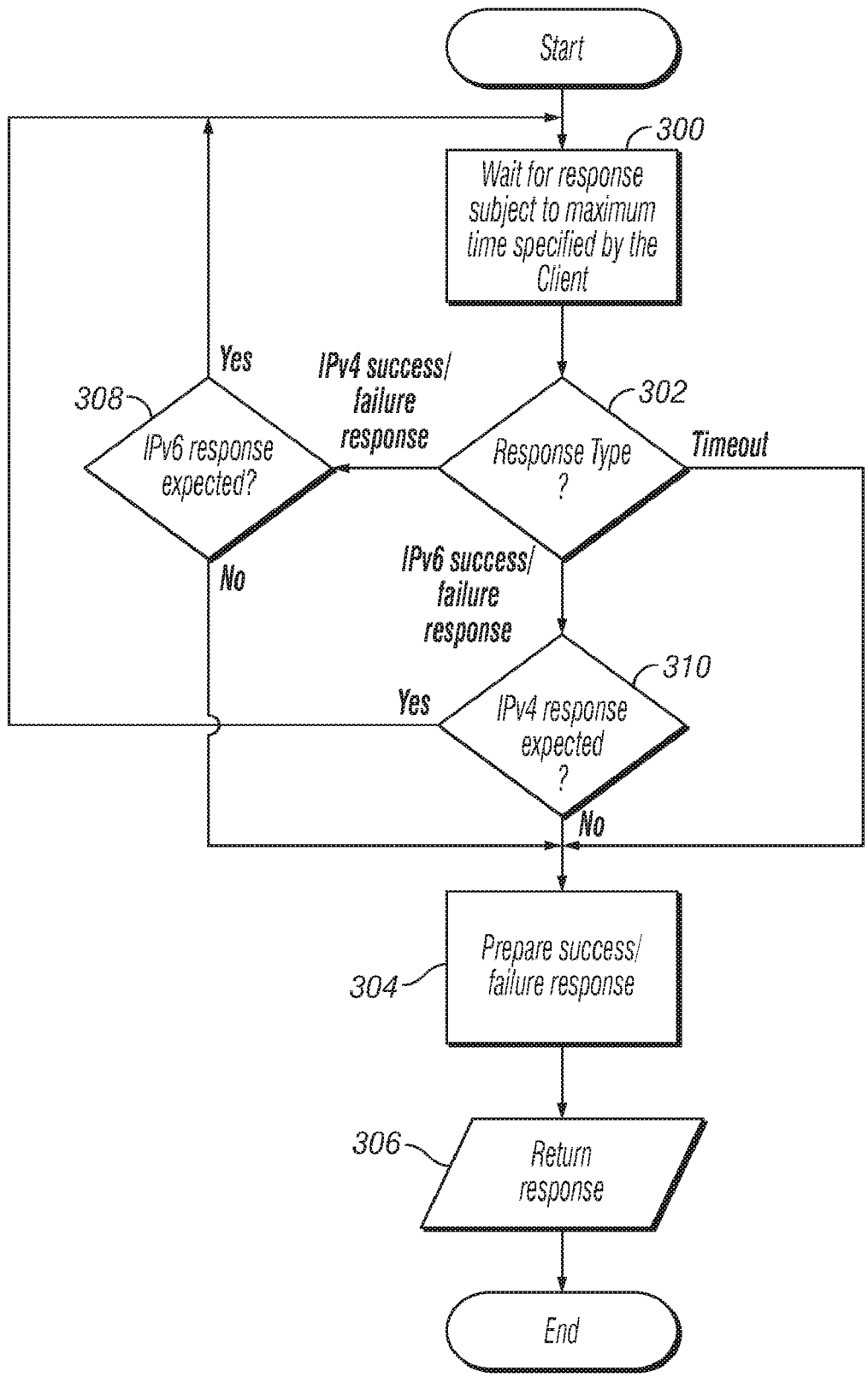
FIG. 3 is a flowchart illustrating exemplary operations performed by the system shown in FIG. 1 for updating cached IP address information during the operations shown in FIG. 2.

It should also be noted that the proxy server 28 can perform the operations shown in FIG. 3 while waiting for a response from the DNS name server 30. For example, in Step 300, the proxy server 28 can wait for a response from the DNS name server 30 for a maximum time specified by the client. In step 302, the proxy server 28 determines what type of response was received. For example, if the request to the DNS name server 30 has timed out, the proxy server 28 can prepare a failure response in Step 304. Thus, in Step 306, the proxy server 28 can return that failure response for delivery to the requesting client by the gateway 12 in Step 106 of FIG. 2. However, if the proxy server 28 determines in Step 302 that the response from the DNS name server 30 indicates an IPv4 response success or failure, the proxy server 28 determines in Step 308 whether an IPv6 response is expected from the DNS name server 30. If an IPv6 response is expected, the processing by proxy server 28 returns to Step 300 and waits for an IPv6 response. When the proxy server 28 determines in Step 302 that the IPv6 response has either been received or failed, the processing by the proxy server 28 also determines in Step 310 whether the proxy server 28 is still waiting for an IPv4 response. If so, the processing by the proxy server 28 repeats as discussed above beginning at Step 300 until the IPv4 and/or IPv6 responses have either succeeded or failed. Upon determining whether the IPv4 and IPv6 responses have either been received or failed, the processing continues to Step 304 as discussed above. The proxy server 28 can prepare a success or failure response in Step 304. If the response is a success response, the proxy server 28 can create the new cache entry in Step 112 in FIG. 2, and in Step 306, the proxy server 28 can return that updated cached entry for delivery to the requesting client by the gateway 12 in Step 106 of FIG. 2. However, if the response is a failure response, the proxy server 28 can return that failure response for delivery to the requesting client by the gateway 12 in Step 106 of FIG. 2.

In addition, it is possible that some or all of the IP addresses in the response may be different from the addresses that were received during the previous update.

Thus, instead of the proxy server 28 initiating back refresh when a client request is received and the cached entry is found to have expired as discussed above, the proxy server 28 can instead initiate back refresh immediately on detecting a cache entry expiry irrespective of whether or not a request was received. The proxy server 28 can, for example, either perform periodic scanning of the entire cache for expired entries, or use timers to track the valid duration of each entry and then initiate the back refresh on timer expiry. In any event, the process of initiating back refresh when a client request is received, instead of upon detecting a cache entry expiry, is more simple to implement and consumes less resources.

Figure 4:
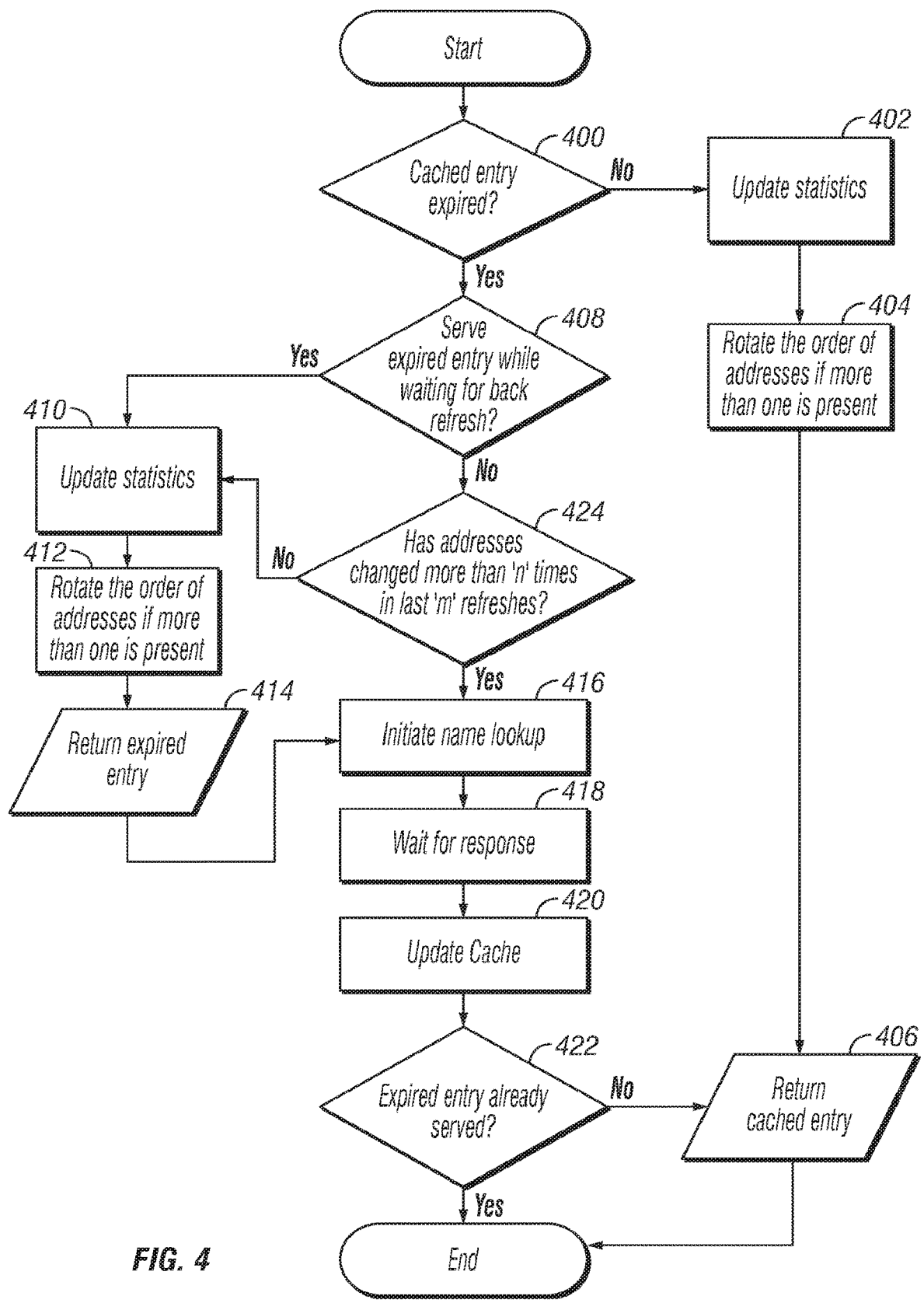
FIG. 4 is a flowchart illustrating further exemplary operations performed by the system shown in FIG. 1 for performing DNS name and IP address resolution according to a disclosed embodiment.

As further discussed above, the proxy server 28 can serve an expired IP address cache entry to the requesting client while the proxy server 28 is waiting for an updated IP address from, for example, the DNS name server 30. For example, as shown in the flowchart of FIG. 4, when a name lookup request from a client arrives at the proxy server 28, the proxy server 28 can determine in Step 400 whether a cached IP address entry for that domain name has expired. If the cached IP address is not expired, the proxy server 28 can, for example, update the statistics associated with that cached IP address (e.g., the frequency of requests) in Step 402. The proxy server 28 can also reorder the cached IP addresses in Step 404 if, for example, more than one cached IP address for a domain name is stored in the cached. In Step 406, the proxy server 28 can return the cached IP address for delivery to the requesting client by the gateway 12.

The reordering performed in Step 404 can be for load balancing purposes as understood in the art. For example, when a response by the proxy server 28 contains multiple IP addresses, usually a client will simply use the first IP address in the response. Since this has the potential of overloading the server whose IP address occurs first in the list, the DNS name servers 30 typically will reorder the listing of IP addresses within the response every time a name lookup request is received for the same domain. This reordering or rotation helps in distributing the load on the servers. Thus, the DNS proxy by the proxy server 28 also supports a similar rotating scheme every time the client requests name resolution. In addition, the connectivity feedback mechanism of the proxy server 28, as described below with regard to the flowchart of FIG. 5, enables use of load balancing based on more reliable measurements of load. For example, the connectivity success rate and/or average throughput information can be used to select the least loaded server, and thus, the IP address for that least loaded server can be reordered as the first IP address during the reordering in Step 404.

Referring back to Step 400, if the proxy server 28 determines that a cached IP address entry is expired, the proxy server 28 can determine in Step 408 whether to serve this expired entry to the client while waiting for the response from the DNS name server 30 to update the IP address in the cached as discussed above with regard to FIGS. 2 and 3. For instance, even though the TTL of the requested IP address has elapsed, as understood in the art, the majority of domain name to IP address mappings do not change often. Therefore, the proxy server 28 can serve expired IP address entries to the client and in parallel initiate an automatic back refresh operation.

Therefore, if the proxy server 28 determines in Step 408 that the proxy server 28 will serve the expired IP address, the proxy server 28 can update the statistics associated with that cached IP address (e.g., the frequency of requests) in Step 410, and reorder the cached IP addresses in Step 412 as discussed above with regard to, for example, Steps 402 and 404. In Step 414, the proxy server 28 can then return the expired cached IP address for delivery to the requesting client by the gateway 12. The proxy server 28 can then the proxy server 28 can initiate the domain name—IP address lookup with the DNS name server 30 in Step 416, wait for a response in Step 418 and update the cache in Step 420 in a manner similar to those associated with Steps 108, 110 and 112 in FIG. 2 as discussed above. If the proxy server 28 determines in Step 422 that that the proxy server 28 has as already returned the expired IP address (i.e., in Step 414), the proxy server 28 need not return the updated IP address. However, if the proxy server 28 determines in Step 422 that that the proxy server 28 has not returned the expired IP address, the proxy server 28 can return the updated IP address in Step 406 for delivery to the requesting client by the gateway 12.

However, referring back to Step 408, if the proxy server 28 determines that the expired IP address entry will not be served, the proxy server 28 can determine in Step 424 whether the IP address has changed more than a designated number of times (e.g., n times) in the last designated number of IP address refreshes (e.g., m refreshes). That is, if the back refresh results in addresses that have not changed then the time spent for waiting for a response (which will be non-negligible for recursive lookups) is saved and there is no penalty associated with serving expired addresses. However, there may be cases when the IP addresses may have changed. In such cases, the client may experience connectivity problems due to the use of incorrect IP addresses. The proxy server 28 can minimize serving expired entries by maintaining historical information how often the IP addresses change for a given domain and use that information to determine if the expired entry should be served or not. If IP addresses have changed more than "n" times in the last "m" back refresh operations, where "n" and "m" are configurable parameters, then the proxy server 28 does not serve the expired IP address entry. Instead, the proxy server 28 begins performing the back refresh operations in Step 416, and the request from the client is blocked until a response is received. However, if the IP addresses have not changed more than "n" times in the last "m" back refresh operations, the proxy server 28 can perform the processing beginning in Step 410 and return the expired entry in Step 414 as discussed above.

Figure 5:
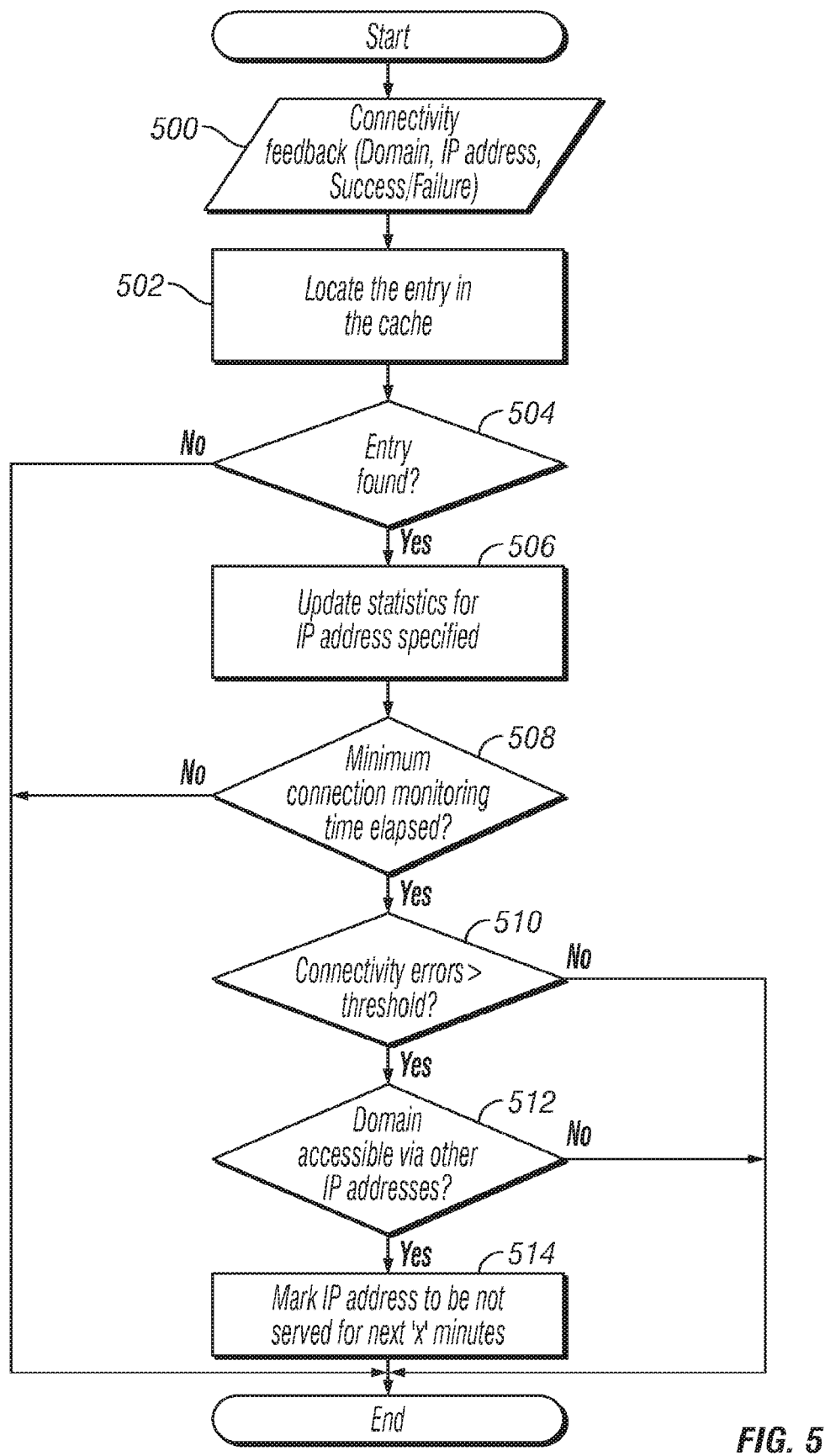
FIG. 5 is a flowchart illustrating exemplary operations performed by the system shown in FIG. 1 to address connectivity issues associated with IP addresses used in the operations shown in FIGS. 2 through 4 according to a disclosed embodiment.

The flowchart in FIG. 5 illustrates an example of operations performed by the proxy server 28 to address, for example, connectivity issues associated with the IP addresses, and thus improve end-to-end network performance. As discussed above, the DNS name servers 30 typically are completely unaware of actual connectivity conditions. Also, the IP addresses supplied in the response may not be useable by the clients. For example, if the network interface on which the supplied IP address of a server (e.g., a content provider 32) is faulty, then the clients will not be able to establish connection with that server. In some cases, the DNS record exists on the DNS name server 30 but the server (e.g., the content provider 32) is decommissioned, or the server is not yet configured to the use the IP addresses. Connectivity issues due to above issues may be temporary or could be long term. If the above conditions can be detected, then by temporarily excluding the IP addresses from being served, connectivity errors will be minimized.

Accordingly, the DNS proxy of the proxy server 28 can use connectivity feedback from the clients. The proxy server 28 may use this information in an asynchronous way while performing operations such as those described above with regard to FIGS. 2 through 4. Whenever the proxy server 28 (DNS proxy) receives an update on connectivity metrics in Step 500, the proxy server 28 can attempt to locate the entry in the cache in Step 502. If the proxy server 28 determines in Step 504 that the entry cannot be found, then no updating occurs. However, if the proxy server 28 locates the entry in Step 504, then the proxy server 28 updates the cache entry with that connectivity feedback information in Step 506. The connectivity feedback information can include information such as domain name, IP address, connectivity success/failure indications, connection establishment time, average throughput and any other suitable information.

When the connection monitoring time has elapsed in Step 508, the proxy server 28 can stop updating the information. However, if the connection monitoring time has not elapsed, the proxy server 28 can determine in Step 510 if, for example, the number of connectivity errors for a specific address exceeds a configurable threshold, and can determine in Step 512 if the domain is accessible via other IP addresses. If either of the conditions in Steps 510 or 512 exists, then in Step 514 the proxy server 28 (DNS proxy) can exclude that specific IP address from being served to the clients for a configurable period of time. After the exclusion time period elapses, the proxy server (DNS proxy) can include the IP address in the response served to the client.

It should also be noted that a small percentage connectivity errors are normal, due to, for example, an overloaded server or temporary packet drops. The DNS proxy takes these issues into account by monitoring the served IP address for minimum time period in Step 510 before deciding to exclude them. The connectivity feedback information can also be used to detect temporary, persistent or security issues with specific domains. Temporary failures typically involve, for example, the proxy server 28 notifying the network operations, and no further action is required. The operations shown in FIG. 5 can also be used detect deliberate denial of service type attacks, where the domain resolves to an valid IP address, but all attempts to establish connection with the server is unsuccessful. As understood in the art, such attacks drain the proxy servers and other network components of crucial resources, and sometimes severely degrade the network performance. The DNS proxy detects such malicious accesses by monitoring the rate of lookup requests and the corresponding failure rate. As a corrective/protective action the DNS proxy can purposefully return a name lookup failure result to the client, thereby minimizing the consumption of server resources. In addition, the DNS proxy can also notify the network operations of the offending domains.

In addition to the features described above, the proxy server 28 can perform operation such as intelligent caching, automatic scaling of back refreshes during busy hours, adaptive cache resizing, and inter-DNS proxy communication for sharing cache information.

Intelligent Caching

When performing intelligent caching, the proxy server 28 can refrain from caching name resolutions that change frequently. That is, once a cache entry is created, the DNS proxy can update the entry during the automatic back refresh operation, and at every update. DNS proxy monitors the IP addresses are monitored for changes. If a domain is found to have frequent IP address changes, then the overhead of consulting the cache, maintaining and tracking history and statistics can all be avoided by simply not caching the name resolutions any more. The DNS proxy can delete the entry from the cache and add the domain name to a "bypass cache" list that the proxy server 28 can check prior to cache lookup. In addition, the DNS proxy can load IP addresses of servers that perform specialized/custom functions in the cache, without having to add them to the DNS registry. The proxy server 28 and network applications can continue to use symbolic name in accessing these servers. Also, because the cache size is limited, once the allowed maximum size is reached, other entries are deleted to make room for new entries. During busy hours or in heavily loaded networks, the cache evictions may occur at frequent rate and cause recently added entries to be evicted, and only added again. The DNS proxy can minimize this thrashing effect by excluding popular domains and domains with high hit count from eviction. The DNS proxy can create a list of popular domains to be excluded from eviction can supplied by, for example, tracking hit counts during operation and automatically marking those entries that exceed a configurable threshold for exclusion. Furthermore, domains accessed by special category of users or applications can be automatically loaded by the proxy server 28 when the presence of the user/application is detected. Once the user/application goes offline, the proxy server 28 can delete these cached entries. The DNS proxy can thus receive a trigger from an external entity to load these domains. For example, when a proxy detects presence of the special users or applications, that proxy can inform the DNS proxy to load a preconfigured list of domains. Moreover, to further improve response time as discussed herein, another enhancement to optimize caching resources and the risk of scaling older entries is to base the aggressiveness of caching on the response time for the DNS queries to certain domains. In other words, by the DNS proxy keeping a running average of response times per domain, it is possible for the DNS proxy to determine which domain names require more time to resolve, and to more aggressively cache domains with longer response times as would be understood in the art.

Scaling Back Refreshes

During busy hours or during periods of congestion, the rate of back refreshes may increase to point impacting the network performance. The DNS proxy can be configured to detect network busy hours or congestion by monitoring the rate of DNS lookup requests. The DNS proxy can scale down the number back refreshes during busy hours or congestion periods, and can return back to normal rate after busy hours or congestion abatement. The scaling down of auto back refresh also makes use of the historical information on rate at which IP addresses change. For domains that exhibit no changes or very infrequent IP address change, the rate of back refreshes can be scaled down by initiating back refreshes every "q" expiry detections, where "q" is configurable parameter. Normally the back refresh is initiated every time a cache entry expiry is detected as discussed above, but with the scaling down that refresh operation can initiated after detecting "q" consecutive cache entry expires. Also, the DNS proxy can refrain from scaling down back refreshes for entries that show frequent IP address changes.

Adaptive Cache Resizing

As with automatic scaling of back refreshes, busy hour and congestion events can be used to dynamically resize the cache. Depending on the memory constraints of the subsystem on which the DNS proxy implementation runs, the cache size can be dynamically increased or decreased. When cache size is decreased (there by freeing up memory for other processes), cache entries corresponding to the most popular and a list of preconfigured domains will be retained. Entries of less popular and infrequently used domains will be deleted to free up memory.

Inter-DNS Proxy Communication for Sharing Cache Information

As can be appreciated from the above, the DNS proxy can either be centralized in, for example, a proxy server 28, or distributed among, for example, a plurality of proxy servers 28. The distributed approach can be simpler to implement. The DNS proxy configuration can be extended to support inter-DNS Proxy communication using multicast and/or shared file system. As understood in the art, inter-DNS proxy communication enables sharing information on faulty IP addresses and domains, sharing information on servers/hosts used to launch denial of service attacks or other malicious accesses, and minimizing back refresh by sharing refreshed information so that other proxy servers can update the cache without having to initiate a back refresh operation themselves.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, the term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A system for use with a communication network, the system comprising:
   a proxy server configured to, in response to a request identifying a domain name, determine whether domain name resolution information associated with the domain name is stored in a storage accessible by the proxy server and has exceeded an expiration time for the domain name resolution information, provide the domain name resolution information from the storage in response to the request via the network upon determining that the domain name resolution information is stored in the storage, has exceeded the expiration time and meets a delivery condition, and request from a domain name server updated domain name resolution information upon determining that the domain name resolution information is at least one of absent from the storage and has exceeded the expiration time,
   the proxy server further configured to evaluate an occurrence at which updated domain name resolution information corresponds to the domain name resolution information, and the proxy server determines that the domain name resolution information meets the delivery condition when the occurrence is above a predetermined number of occurrences.

2. The system according to claim 1, wherein
   the proxy server is further configured to provide the updated domain name resolution information as requested from the domain name server in response to the request upon determining that the domain name resolution information is absent from the storage.

3. The system according to claim 1, wherein
   the proxy server is configured to provide the domain name resolution information from the storage while also requesting the updated domain name resolution information from the domain name server when the domain name resolution information in the storage has exceeded the expiration time.

4. The system according to claim 3, wherein
   the proxy server is configured to replace the domain name resolution information in the storage with the updated domain name resolution information requested from the domain name server.

5. The system according to claim 1, wherein
   the proxy server is disposed at a gateway of the communication network which is a satellite communication network.

6. A system for use with a communication network, the system comprising:
   a proxy server configured to, in response to a request identifying a domain name, determine whether domain name resolution information associated with the domain name is stored in a storage accessible by the proxy server and has exceeded an expiration time for the domain name resolution information, provide the domain name resolution information from the storage in response to the request via the network upon determining that the domain name resolution information is stored in the storage, has exceeded the expiration time and meets a delivery condition, and request from a domain name server updated domain name resolution information upon determining that the domain name resolution information is at least one of absent from the storage and has exceeded the expiration time,
   the proxy server further configured to evaluate a success rate at which content is successfully provided in response to the request using the domain name resolution information, and the proxy server determines that the domain name resolution information meets the delivery condition when the success rate is above a predetermined number of occurrences.

7. The system according to claim 6, wherein
   the delivery condition pertains to a delay time indicated in the request.

8. The system according to claim 6, wherein
   the delivery condition pertains to information indicating a frequency at which the domain name resolution information is changed by the domain name server.

9. A system for use with a communication network, the system comprising:
   a proxy server configured to, in response to a request identifying a domain name, determine whether domain name resolution information associated with the domain name is stored in a storage accessible by the proxy server and has exceeded an expiration time for the domain name resolution information, provide the domain name resolution information from the storage in response to the request via the network upon determining that the domain name resolution information is stored in the storage, has exceeded the expiration time and meets a delivery condition, and request from a domain name server updated domain name resolution information upon determining that the domain name resolution information is at least one of absent from the storage and has exceeded the expiration time,
   the domain name resolution information including a plurality of IP addresses associated with the domain name; and
   the proxy server is-further configured to periodically change an order of the IP addresses in the domain name resolution information stored in the storage.

10. The system according to claim 9, wherein
    the delivery condition pertains to information representing connectivity of a content provider associated with the domain name.

11. The system according to claim 9, wherein
    the proxy server is further configured to share information pertaining to the content provider associated with the domain name with other proxy servers accessible to the communication network.

12. A system for use with a communication network, the system comprising:
    a proxy server configured to, in response to a request identifying a domain name, determine whether domain name resolution information associated with the domain name is stored in a storage accessible by the proxy server and has exceeded an expiration time for the domain name resolution information, provide the domain name resolution information from the storage in response to the request via the network upon determining that the domain name resolution information is stored in the storage, has exceeded the expiration time and meets a delivery condition, and request from a domain name server updated domain name resolution information upon determining that the domain name resolution information is at least one of absent from the storage and has exceeded the expiration time,
    the proxy server further configured to delete the domain name resolution information stored in the storage upon determining that a frequency of requests for the domain name received by the proxy server fails to meet a predetermined threshold.

13. A method for controlling a server for a communication network, the method comprising:

controlling the server to, in response to a request identifying a domain name, determine whether domain name resolution information associated with the domain name is stored in a storage accessible by a proxy server and has exceeded an expiration time for the domain name resolution information;

controlling the server to provide the domain name resolution information from the storage in response to the request via the network upon determining that the domain name resolution information is stored in the storage, has exceeded the expiration time and meets a delivery condition;

controlling the server to request from a domain name server updated domain name resolution information upon determining that the domain name resolution information is at least one of absent from the storage and has exceeded the expiration time; and controlling the server to evaluate an occurrence at which updated domain name resolution information corresponds to the domain name resolution information, and the proxy server determines that the domain name resolution information meets the delivery condition when the occurrence is above a predetermined number of occurrences.

14. The method according to claim 13, further comprising controlling the server to provide the updated domain name resolution information as requested from the domain name server in response to the request upon determining that the domain name resolution information is absent from the storage.

15. The method according to claim 13, further comprising controlling the server to provide the domain name resolution information from the storage while also requesting the updated domain name resolution information from the domain name server when the domain name resolution information in the storage has exceeded the expiration time.

16. The method according to claim 15, further comprising controlling the server to replace the domain name resolution information in the storage with the updated domain name resolution information requested from the domain name server.

17. A method for controlling a server for a communication network, the method comprising:

controlling the server to, in response to a request identifying a domain name, determine whether domain name resolution information associated with the domain name is stored in a storage accessible by a proxy server and has exceeded an expiration time for the domain name resolution information;

controlling the server to provide the domain name resolution information from the storage in response to the request via the network upon determining that the domain name resolution information is stored in the storage, has exceeded the expiration time and meets a delivery condition;

controlling the server to request from a domain name server updated domain name resolution information upon determining that the domain name resolution information is at least one of absent from the storage and has exceeded the expiration time; and controlling the server to evaluate a success rate at which content is successfully provided in response to the request using the domain name resolution information, and the proxy server determines that the domain name resolution information meets the delivery condition when the success rate is above a predetermined number of occurrences.

18. A method for controlling a server for a communication network, the method comprising:

controlling the server to, in response to a request identifying a domain name, determine whether domain name resolution information associated with the domain name is stored in a storage accessible by a proxy server and has exceeded an expiration time for the domain name resolution information;

controlling the server to provide the domain name resolution information from the storage in response to the request via the network upon determining that the domain name resolution information is stored in the storage, has exceeded the expiration time and meets a delivery condition;

controlling the server to request from a domain name server updated domain name resolution information upon determining that the domain name resolution information is at least one of absent from the storage and has exceeded the expiration time;

the domain name resolution information including a plurality of IP addresses associated with the domain name; and periodically changing an order of the IP addresses in the domain name resolution information stored in the storage.

* * * * *